United States Patent [19]

Bodolay et al.

[11] Patent Number: 6,098,369
[45] Date of Patent: *Aug. 8, 2000

[54] APPARATUS FOR ATTACHING A RECLOSABLE FASTENER TO A FLEXIBLE MATERIAL

[76] Inventors: William A. Bodolay, P.O. Box 6943, Lakeland, Fla. 33807; Donald K. Wright, 3750 Viola La., Murphysboro, Ill. 62966; Lester Siebert, 4620 Wing Hill Rd., Cobden, Ill. 62920

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/118,575

[22] Filed: Jul. 17, 1998

[51] Int. Cl.[7] .................................................. B65B 61/20
[52] U.S. Cl. .......................... 53/133.4; 53/139.2; 493/213
[58] Field of Search ............................... 53/133.4, 139.2; 493/213, 238, 380

[56] References Cited

U.S. PATENT DOCUMENTS

| | | |
|---|---|---|
| 3,948,705 | 4/1976 | Ausnit . |
| 4,233,331 | 11/1980 | Lemke et al. . |
| 4,384,915 | 5/1983 | Utsumi . |
| 4,548,018 | 10/1985 | Wojnicki . |
| 4,605,459 | 8/1986 | Voltmer et al. . |
| 4,691,373 | 9/1987 | Ausnit . |
| 4,881,932 | 11/1989 | Blatt ........................................ 493/213 |
| 5,024,537 | 6/1991 | Tilman . |
| 5,024,645 | 6/1991 | Soubrier et al. . |
| 5,036,643 | 8/1991 | Bodolay ................................. 493/213 |
| 5,065,899 | 11/1991 | Tilman . |
| 5,076,038 | 12/1991 | Costa . |
| 5,461,845 | 10/1995 | Yeager . |
| 5,601,368 | 2/1997 | Bodolay et al. . |
| 5,776,045 | 7/1998 | Bodolay et al. ....................... 53/133.4 |
| 5,823,933 | 10/1998 | Yeager ................................... 493/213 |

*Primary Examiner*—John Sipos
*Assistant Examiner*—Steven Jensen
*Attorney, Agent, or Firm*—Pettis & Van Royen, P.A.

[57] ABSTRACT

An apparatus for attaching a reclosable fastener to a web of flexible material primarily intended for use with a host packaging machine to form a reclosable container. The attaching apparatus is operatively connected to and driven by a programmable motor and function controller in cooperative relation with the host machine and guides the web of flexible material from which the containers will ultimately be formed along a first path through the attaching apparatus. A supply of reclosable zipper-type fasteners is also provided, and the fasteners are guided along a second path of the apparatus. Individual zipper-type fasteners are removed from the fastener supply path and disposed in juxtaposition to a segment of the flexible material in overlying relation to a cut which has been formed through a predetermined segment of the flexible material. The individual fastener is then sealed to the flexible material in overlying, surrounding relation to the cut, and the web, with the reclosable fastener attached thereto, is then passed to the host packaging machine for forming, filling, sealing and separating a reclosable container.

14 Claims, 5 Drawing Sheets

APPARATUS FOR ATTACHING A RECLOSABLE FASTENER TO A FLEXIBLE MATERIAL

BACKGROUND OF THE INVENTION

1. Field of the Invention

The present invention relates generally to an apparatus for attaching a reclosable fastener to a flexible web of material. More particularly, the apparatus of this invention may be operatively attached to a conventional form, fill, seal and separate packaging machine in a manner that enables the packaging machine to produce high quality reclosable packages without interfering with the ordinary operation of the packaging machine.

2. Description of the Prior Art

Reclosable containers utilizing zipper-type fasteners are well known in the packaging industry and are used for holding, displaying and dispensing a wide variety of products ranging from hardware items to food products intended for human consumption. With the increasing consumer preference for reclosable zipper-type plastic bags, there have been continual efforts to develop packaging machines for producing such reclosable packages. This is especially true at the retail level for the sale of preis packaged convenience items such as, for example, food products.

As is also well known in the field of flexible packaging, there presently exist numerous machines for automatically forming, filling and sealing materials in flexible containers. As a result of consumer enthusiasm toward reclosable plastic containers, the packaging industry has sought to develop packaging machines for automatically forming, filling and sealing such reclosable containers. For example, U.S. Pat. No. 5,036,643 discloses a form, fill, seal and separate packaging machine with a means to apply a reclosable zipper to a web of material. However, the means for applying the zipper-type closure to the flexible web is incorporated within the packaging machine. Manufacturers currently utilizing conventional packaging machines are often unable to justify the costs involved with replacing existing machines with one such as disclosed in that '643 patent.

It is. therefore, clear that there remains a great need in the art for a suitable apparatus for attaching a zipper-type closure to a flexible material in a fashion that is particularly adapted to cooperate with existing conventional packaging machines, thus eliminating the requirement for total replacement of present-day packaging machines. In addition, such an apparatus should be capable of adjustment in order to accommodate the manufacture of reclosable packages of various sizes and weight content. Furthermore, such an apparatus should operate in a fashion so that it will not significantly affect the ordinary operation and installation of conventional form, fill, seal and separate packaging machines to which the apparatus would be attached.

SUMMARY OF THE INVENTION

The present invention relates to an apparatus for attaching a reclosable zipper-type fastener to a flexible material primarily intended for use with a host form, fill, seal and separate packaging machine. More specifically, the apparatus of this invention is adapted for use with virtually any conventional host packaging machine without the necessity of major modification or adjustment to the existing machine or its normal manner of operation.

In the present invention, the apparatus is operatively attached to the host packaging machine and driven by at least one programmable motor and function controller in cooperative relation with the host machine. The web of flexible material from which the host machine will ultimately form packages is directed along a first path of the apparatus by guide rollers, and a punch, or other such similar cutting device, positioned along the first path of travel makes at least one cut through a predetermined segment of the web to form a removable portion of flexible material that will ultimately provide both convenient and tamper-evident access to the reclosable fastener of the finished container. While movement of the web along the first path is driven by the host machine, intermittent movement of the web along the first path is controlled by a web position detector disposed along that first path and operatively connected to the programmable motor and function controller, for detection of the web of flexible material at predetermined intervals. The actual position of the cutting punch along the first path is adjustable dependent upon the size of the finished container to be made by the host machine.

The apparatus of this invention further comprises means for supplying a plurality of reclosable zipper-type fasteners and guiding those fasteners along a second path of travel through the apparatus by the programmable motor and function controller. Disposed downstream from the primary supply of reclosable fasteners at what may be termed the distal end of the second path of travel is a pusher for engaging an individual one of the fastener strips to index the fasteners along the second path to means for transferring individual fastener strips into juxtaposition with the segment of the flexible material for sealing in overlying relation to the cut made therein.

In the preferred embodiment of the present invention, the supply of reclosable zipper-type fasteners comprises a roll of fasteners, with adjacent ones attached to each other at their respective fused ends such that the sealing strips are disposed in substantially transverse relation to the direction of travel of the second path through the apparatus. Just downstream from the pusher, a separator, preferably defined by a pair of knives, detaches an individual one of the fastener strips from the supply, and the detached strip is placed within a corresponding one of a plurality of strip receivers formed on the surface of a transfer drum. The individual strips are retained within their corresponding strip receiver, and, in the preferred embodiment, the programmable motor intermittently rotates the transfer drum in response to signals received from the function controller so as to dispose one of the strip receivers and the detached strip held therein into juxtaposition with one of the cuts formed in the web of flexible material. Means are provided for releasing the strip from its retainer and, then, for sealing the strip to the flexible web.

The flexible web having reclosable zipper-type fasteners sealed thereto is then passed to the host machine for forming, filling, sealing and separating reclosable containers therefrom.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
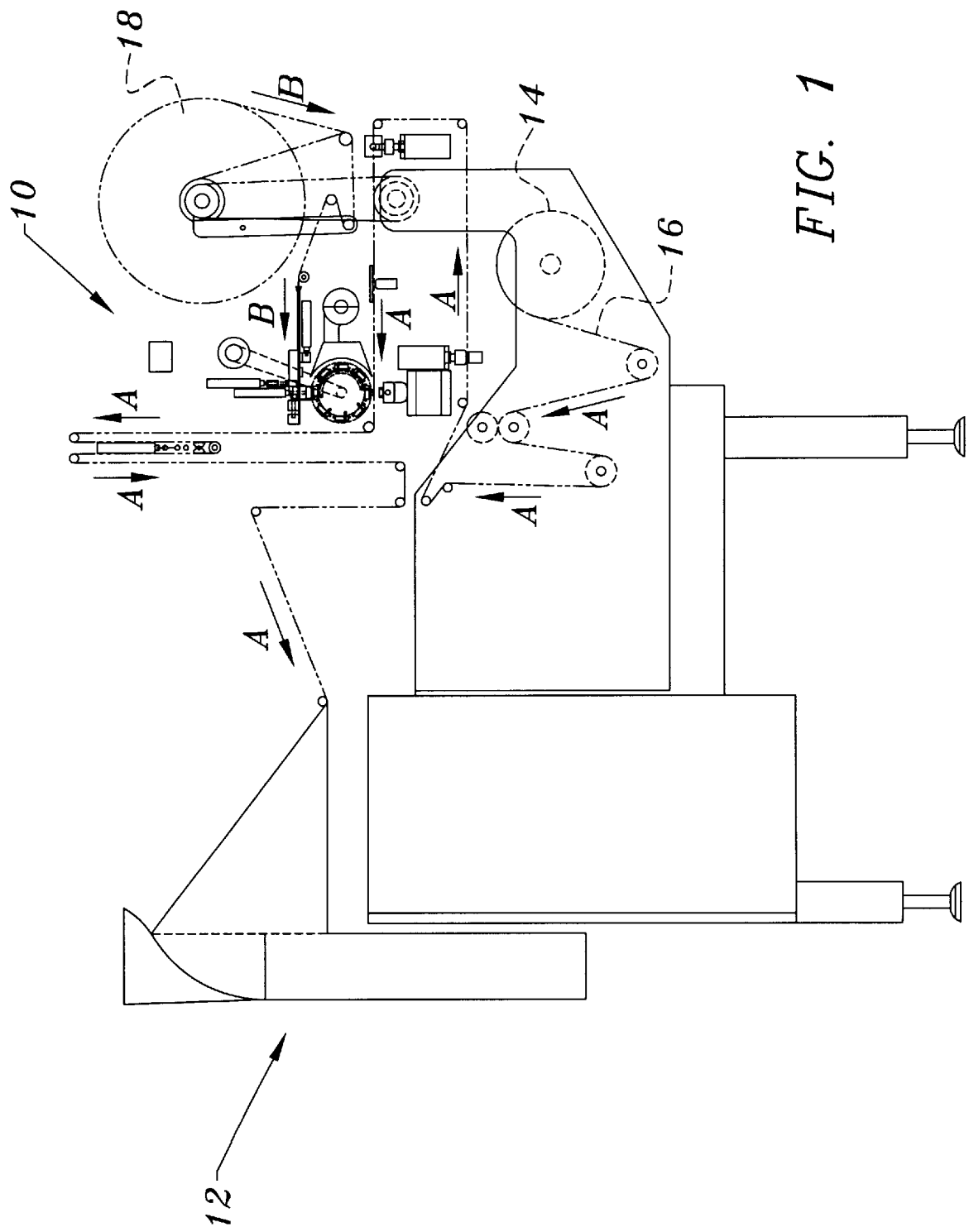
FIG. 1 is a side elevation of a host packaging machine with the apparatus of this invention operatively attached thereto.
Figure 2:
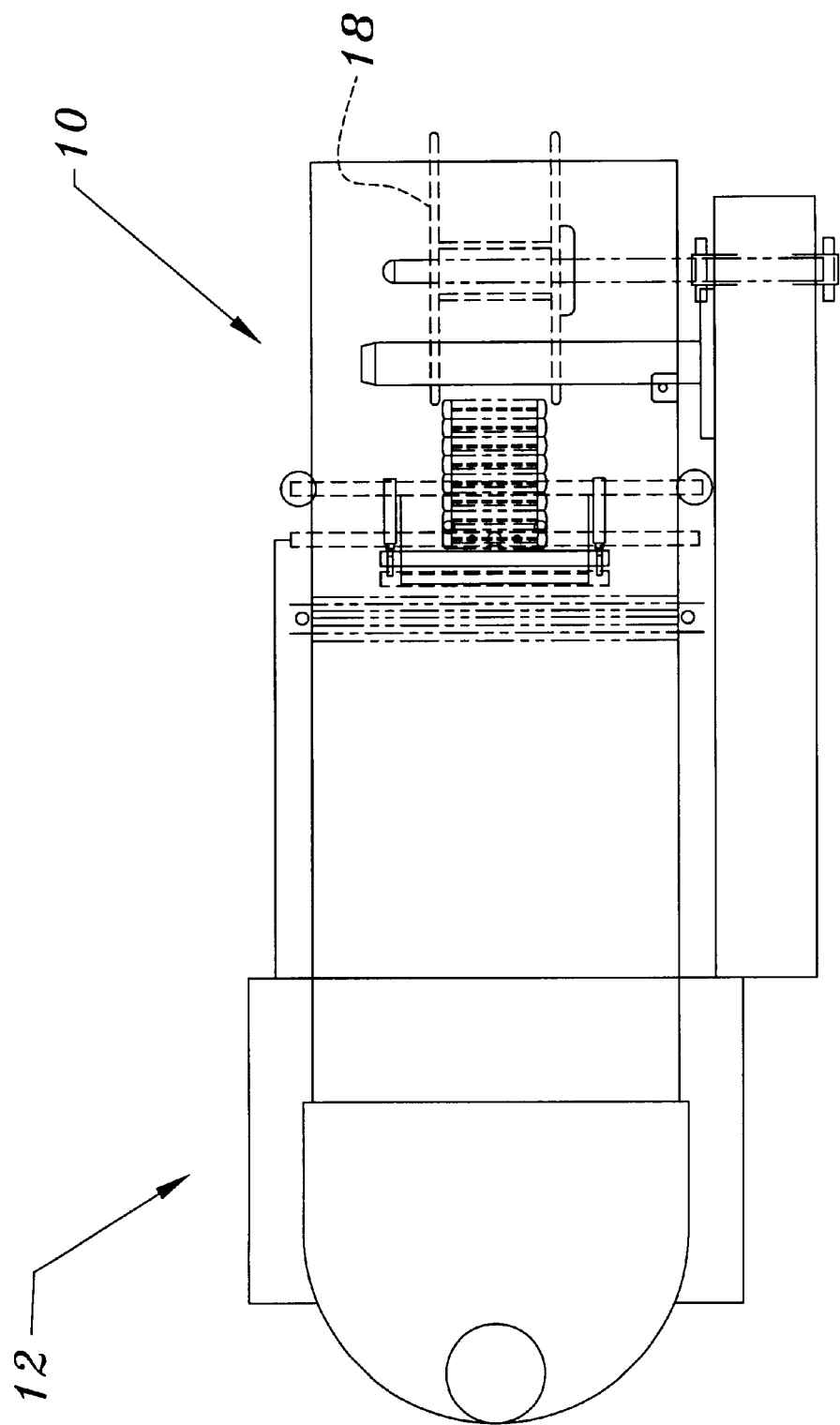
FIG. 2 is a top plan view of the host machine and apparatus shown in the view of FIG. 1.

In the view of FIG. 1, the fastener attaching apparatus of this invention is generally indicated as 10, and is shown as being operatively attached to a host form, fill, seal and separate packaging machine generally indicated as 12. While the scope of this invention is not to be limited by the host machine to which it is operatively attached, a vertical form, fill, seal and separate machine is illustrated in the drawing figures as host machine 12. As is well known in the industry, host machine 12 would typically include a supply of flexible material from which containers are to be made. The apparatus 10 of this invention utilizes that same supply of flexible material, and the roll of such material is indicated as 14 in the drawing figures. The travel of web 16, indicated by directional arrows A, from roll 14 through apparatus 10, and its treatment by apparatus 10 will be described in greater detail hereinafter.

Still referring to the view of FIG. 1, apparatus 10 further comprises a supply of reclosable zipper-type fasteners, shown in this preferred embodiment as fastener roll 18. Fastener web 20 is guided along a second path, indicated by directional arrows B, for attachment to web 16 as is more fully set forth hereinafter.

It is also to be noted that driving power for apparatus 10 is provided by programmable motor 13 and function controller 11, and that apparatus 10 does comprise a web position detector 22 which is disposed along the first path traveled by web 16 and is operatively connected to controller 11 so as to regulate the travel of both web 16 and fastener web 20. Detector 22 may sense indicia disposed on the surface of web 16 and actually transmits signals to controller 11 to cause the travel along path A and second path B to start and stop dependent upon the size of the finished container being made by host machine 12 so as to ensure proper placement of the reclosable fastener onto web 16. Alternatively, detector 22 may employ other means, such as a roller engaging a surface of web 16, to detect its travel along path A. Referring to the more detailed view of FIG. 3. one may see a preferred location for detector 22 along path A, downstream from roll 14.

Figure 3:
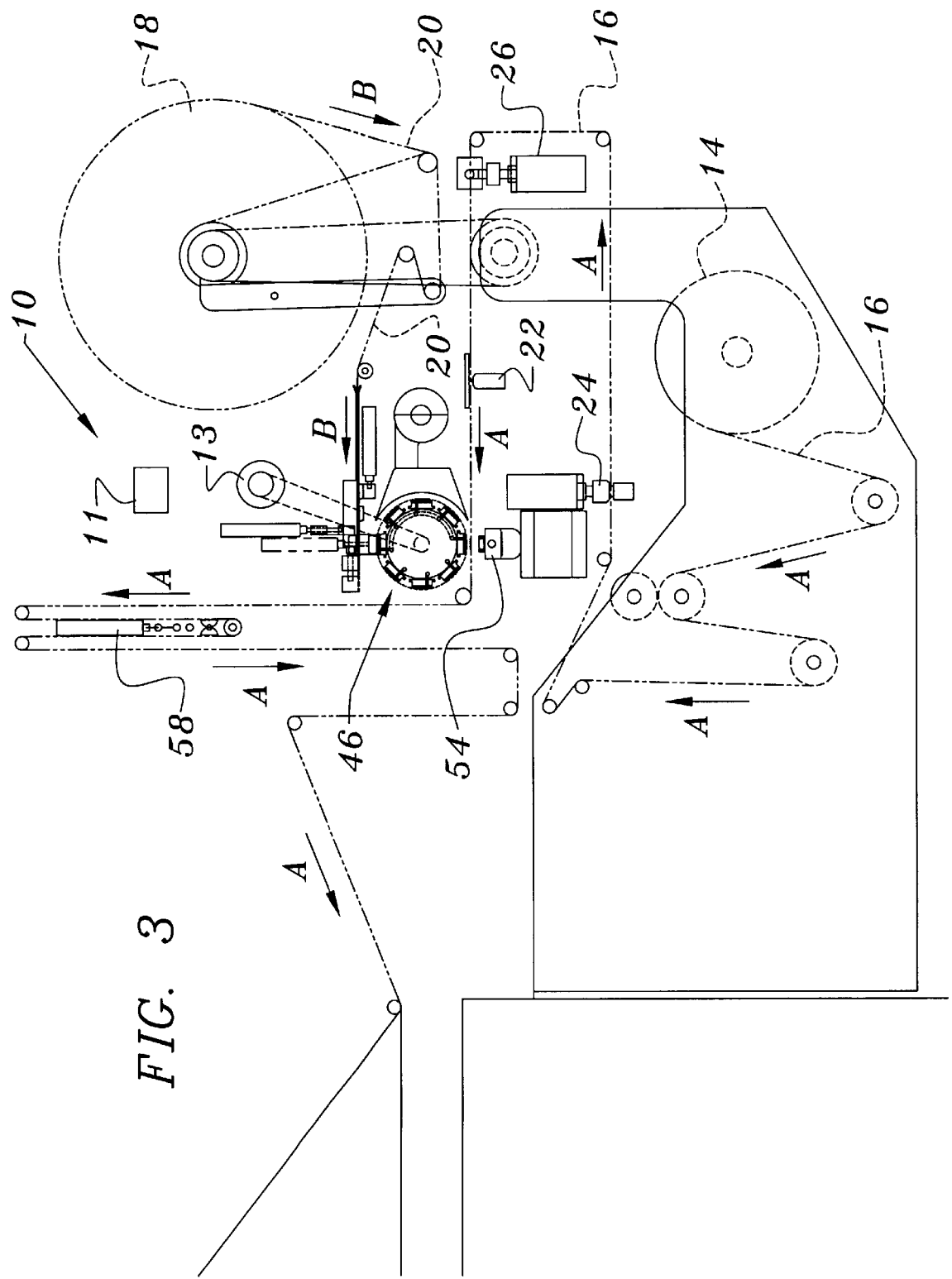
FIG. 3 is an enlarged side elevation of the apparatus of this invention as shown in the view of FIG. 1.

Still referring to the view of FIG. 3, when detector 22 senses the presence of an indicia calling for the movement of web 16 to halt, this is accomplished by sending a signal to controller 11 which in turn causes the application of web brake 24. When web 16 is thus stopped, punch 26 is actuated to perforate a segment of web 16, thereby forming a removable portion of flexible material in web 16. Attention is now invited to the detailed view of FIGS. 4 and 5 as well as the view of FIG. 3, with particular regard to the elements of apparatus 10 whereby individual reclosable zipper-type fasteners 28 are attached to web 16 in overlying, surrounding relation to the removable portion formed by punch 26. Fastener web 20 comprises a plurality of individual zipper-type fasteners 28, each defining a perimeter and having opposed distal ends. The term "perimeter" refers to the outer boundary defined by each one of the individual fasteners 28, as perhaps best seen in the view of FIG. 5. Each fastener 28 comprises a pair of mating, reclosable sealing strips, one of which is a male fastener part and the other of which is a female fastener part. The male and female parts are joined to each other and the opposed distal ends are fused (flattened and broadened) as indicated at 30 in the view of FIG. 5. Adjacent ones of the fasteners 28 are joined together at fused distal ends 30 as by a weld 32 so as to provide a fastener web 20 wherein the reclosable zipper-type fasteners 28 move along second path B with the sealing strips disposed in substantially transverse relation to the direction of travel. Weld 32 may actually be formed when the distal ends are flattened and broadened as indicated at 30. Thus, in the detail view of FIG. 4, one sees an end view of the fastener web 20 that is transverse to second path B.

Figure 4:
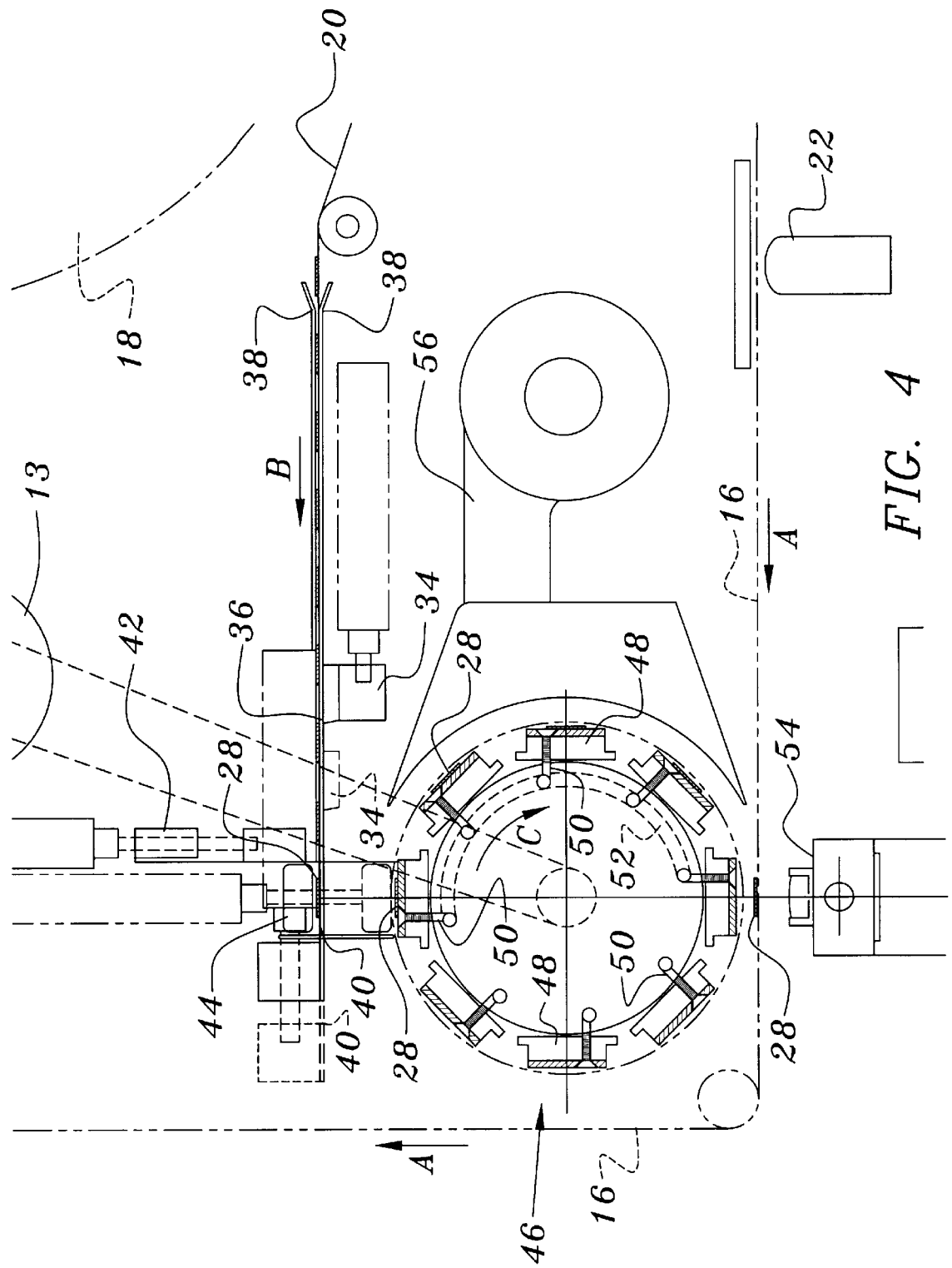
FIG. 4 is a further enlarged side elevation of the apparatus of this invention showing the means for guiding the fasteners and the means for transferring individual ones of the fasteners.
Figure 5:
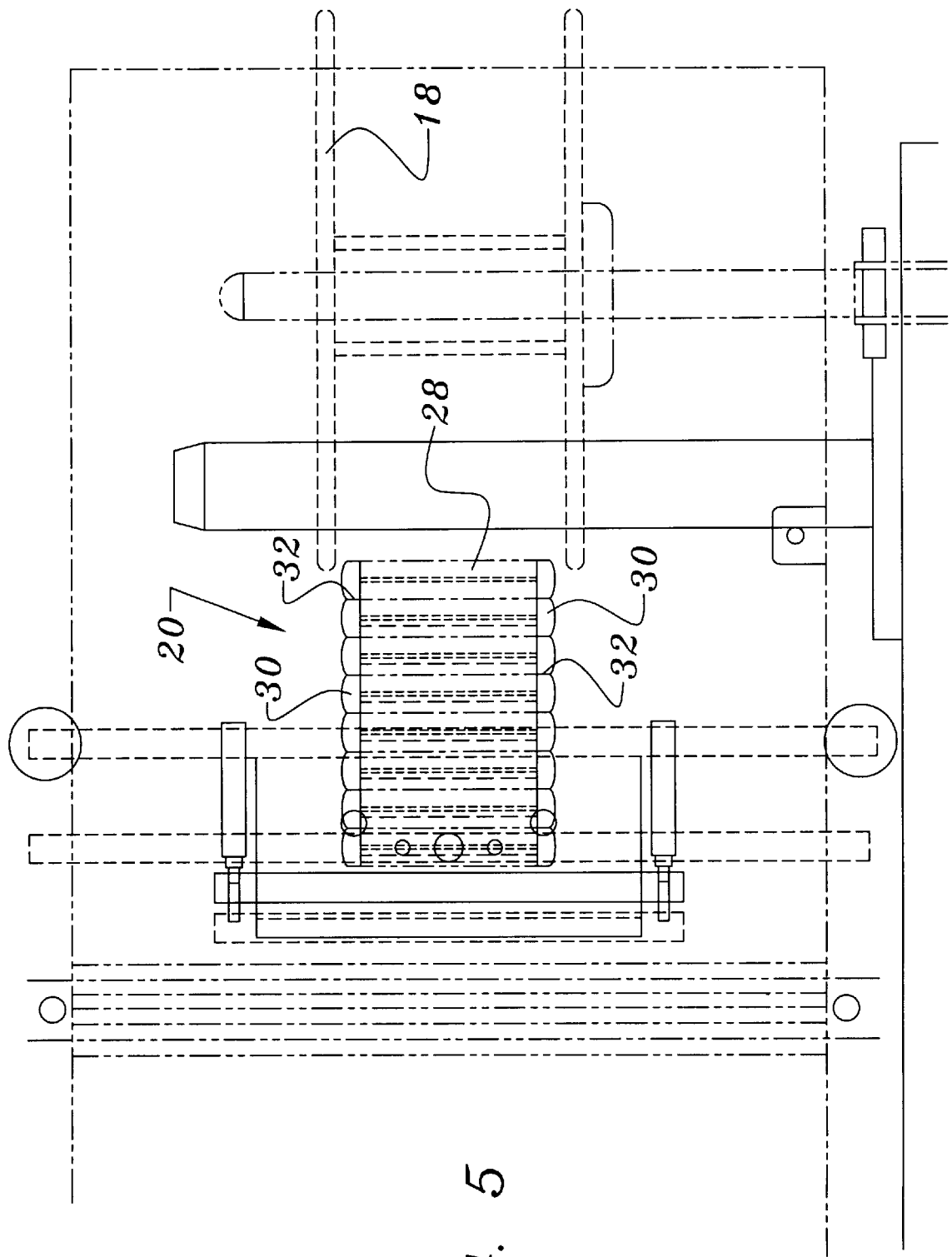
FIG. 5 is an enlarged top plan view of the apparatus of this invention as is shown in the view of FIG. 2.

Movement of fastener web 20 along path B is accomplished by pusher 34 which reciprocates as shown in phantom in the view of FIG. 4 in response to signals received from controller 11. Tip 36 of pusher 34 abuts the lip defined by the joining of the male and female fastener parts of each fastener 28, thereby indexing web 20 along second path B.

As fastener web 20 is indexed along second path B through guide 38, the last, or most distal, individual fastener 28 rests on shutter 40 with shutter 40 supporting distal fastener 28, separator 42 is actuated by controller 11 to detach welds 32, thereby separating the distal fastener 28 from fastener web 20. While separator 42 may comprise any suitable device for separating individual fasteners 28 from fastener web 20, in this preferred embodiment, separator 42 comprises a pair of knife edges. Shutter 40 is then retracted as shown in phantom in the view of FIG. 4, and plunger 44 is actuated to transfer the separate distal fastener 28 onto the transfer drum generally indicated as 46. These actions are also controlled by signals received from controller 11.

Transfer drum 46 indexes clockwise, as indicated by directional arrow C in the view of FIG. 4 and is driven by motor 13 which is also operated by signals received from controller 11. Disposed around the perimeter of transfer drum 46 are a plurality of strip receivers 48. Passageways 50 are formed through each of the receivers 48 and, referring to transfer drum 46 as a clock face for the sake of clarity in the view of FIG. 4, it can be seen that each of the passageways 50 are disposed in fluid-communicating relation to a conduit 52 from approximately the 12 o'clock position to slightly after the 5 o'clock position whereby negative pressure may be drawn through conduit 52 and each of the respective passageways 50 so as to retain an individual fastener 28 within the respective strip receiver 48.

As one of the strip receivers indexes to the 6 o'clock position, communication of passageway 50 with conduit 52 is interrupted, thereby releasing fastener 28 onto web 16. More particularly, the fastener 28 is released onto web 16 in registry with the removable portion formed through web 16 by punch 26 as previously described. Then, sealing means 54 is actuated by controller 11 to attach fastener 28 in overlying, surrounding relation to the removable portion of web 16.

In order to provide for a complete seal of fastener 28 to web 16, this preferred embodiment for apparatus 10 further comprises a heater blower 56 to preheat/condition the fasteners 28 as transfer drum 46 indexes, and this heater blower 56 is operatively disposed from about 1:30 to about 4:30 on the side of transfer drum 46.

Downstream from transfer drum 46 and sealing means 54, web 16, now having individual fasteners 28 attached thereto, continues to move along first path A through festoon 58 for delivery to host machine 12 where a container having a reclosable fastener is formed, filled, sealed and separated. Because apparatus 10 is driven by programmable motor 13 and controller 11 in cooperative relation with the host machine 12, it will be appreciated that the apparatus of the present invention provides to host machine 12 a flexible web of material having reclosable fasteners attached thereto in a non-intrusive manner. More specifically, the addition of apparatus 10 between roll 14 and host machine 12 results in virtually no interference with the normal operation of host machine 12. A substantially constant, uninterrupted supply of web 16 having fasteners 28 attached thereto is provided from festoon 58 Thus, it will be appreciated that this invention provides an improved apparatus for attaching reclosable fasteners to a flexible web of material that is easily adaptable to provide a web of material having reclosable fasteners attached thereto to a conventional form, fill, seal and separate packaging machine, resulting in an overall improved packaging systems capable of producing high quality reclosable packages without the necessity of replacing the entire packaging machine. It is also to be understood that the various elements of apparatus 10, and particularly the programmable motor 13 and controller 11, are easily adjusted in response to particular bag sizes being made by host machine 12. Proper registry of the individual fasteners 28 in overlying relation to the cuts made in web 16 by punch 26 is insured by signals generated from detector 22 sent to and processed by controller 11.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An apparatus for attaching a reclosable zipper-type fastener to a flexible material primarily intended for use with a host form, fill, seal and separate packaging machine to form at reclosable container, said apparatus comprising:

a means for supplying a flexible material to said apparatus;

a programable motor and a function controller operatively connected to each other for driving said apparatus;

means for guiding said flexible material along a first path through said apparatus;

a punch that forms at least one cut through a predetermined segment of said flexible material, said punch being disposed along said first path and operatively connected to said controller;

a means for supplying a plurality of reclosable zipper-type fasteners to said apparatus, each one of said plurality having fused opposed distal ends and being joined to an adjacent one of said plurality at said fused opposed distal ends;

means for guiding said fasteners along a second path through said apparatus;

means for transferring individual ones of said fasteners from said second path to a position substantially adjacent said first path in juxtaposed relation to said cut, said means for transferring being disposed along said second path and being driven by said motor; and means for sealing said one fastener to said flexible material in overlying relation to said cut in response to a signal received from said controller.

2. An apparatus as in claim 1 wherein each one of said fasteners has a perimeter and fastener distal ends, each said one fastener comprising a pair of mating, reclosable sealing strips, one of said strips comprising a male fastener part and the other of said strips comprising a female fastener part, said male and female parts being joined to each other and said fastener distal ends being fused to thereby define a fused fastener strip.

3. An apparatus as in claim 2 wherein adjacent ones of said fused fasteners strips are joined together at said fused ends to provide a supply of said reclosable zipper-type fasteners that move along said second path with said sealing strips disposed in substantially transverse relation to the direction of said second path.

4. An apparatus as in claim 3 wherein said supply of reclosable zipper-type fasteners comprises a roll.

5. An apparatus as in claim 3 wherein said means for guiding said fasteners comprises a pusher for engaging an individual one of said fused fastener strips and indexing said fasteners along said second path seriatim in response to a signal received from said controller.

6. An apparatus as in claim 5 wherein said means for transferring is disposed along said second path downstream from said pusher and comprises a separator for detaching an individual one of said fused fastener strips from said supply of fasteners and a transfer drum including a perimeter surface having at least one detached strip receiver formed on said surface and being disposed in receiving relation to said detached fused fastener strip.

7. An apparatus as in claim 6 wherein said transfer drum comprises a plurality of said detached strip receivers formed on said surface.

8. An apparatus as in claim 7 wherein said transfer drum further comprises means for retaining said strip in said receiver.

9. An apparatus as in claim 8 wherein said transfer drum further comprises means for positioning each of said detached strip retainers, seriatim, adjacent said first path in said juxtaposed relation to said cut and for releasing said detached strip therefrom, whereby said sealing means may attach said detached strip to said flexible material.

10. An apparatus as in claim 9 further comprising a web position detector disposed along said first path and operatively connected to said controller that upon detection of movement of said flexible material controls the travel of said flexible material along said first path, controls the travel of said zipper-type fasteners along said second path, and controls said means for sealing, all through said controller.

11. An apparatus as in claim 10 wherein said flexible material includes a surface having indicia disposed along said surface at predetermined intervals, said web position detector comprising optical means for sensing said indicia.

12. An apparatus as in claim 11 wherein said cut comprises a plurality of cuts.

13. An apparatus as in claim 12 wherein said plurality of cuts comprises a removable portion of said flexible material.

14. An apparatus as in claim 13 wherein said means for scaling attaches said detached strip to said flexible material in overlying, surrounding relation to said removable portion.

* * * * *

UNITED STATES PATENT AND TRADEMARK OFFICE
CERTIFICATE OF CORRECTION

PATENT NO : 6,098,369
DATED : August 8, 2000
INVENTOR(S): William A. Bodolay, et al.

It is certified that error appears in the above-identified patent and that said Letters Patent are hereby corrected as shown below:

Claim 14 Line 2 "scaling" should be --sealing--.

Signed and Sealed this

Twenty-second Day of May, 2001

Attest:

NICHOLAS P. GODICI

Attesting Officer

Acting Director of the United States Patent and Trademark Office